(12) United States Patent
Elie et al.

(10) Patent No.: US 12,416,735 B2
(45) Date of Patent: Sep. 16, 2025

(54) NAVIGATION METHOD AND SYSTEM

(71) Applicants: SAFRAN ELECTRONICS & DEFENSE, Paris (FR); M3 SYSTEMS, L'Union (FR)

(72) Inventors: Philippe Elie, Paris (FR); Vincent Bisgambiglia, Paris (FR); Elie Amani, L'Union (FR); Marc Pollina, L'Union (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 511 days.

(21) Appl. No.: 17/792,956

(22) PCT Filed: Jan. 26, 2021

(86) PCT No.: PCT/EP2021/051693
§ 371 (c)(1),
(2) Date: Jul. 14, 2022

(87) PCT Pub. No.: WO2021/151864
PCT Pub. Date: Aug. 5, 2021

(65) Prior Publication Data
US 2023/0043214 A1 Feb. 9, 2023

(30) Foreign Application Priority Data
Jan. 27, 2020 (FR) ...................................... 2000771

(51) Int. Cl.
*G01S 19/49* (2010.01)
*G01S 5/02* (2010.01)
(Continued)

(52) U.S. Cl.
CPC ............ *G01S 19/49* (2013.01); *G01S 5/0264* (2020.05); *G01S 19/46* (2013.01); *G01C 21/165* (2013.01); *G01S 19/45* (2013.01); *G01S 19/48* (2013.01)

(58) Field of Classification Search
CPC .......... G01S 19/46; G01S 19/49; G01S 19/45; G01S 19/48; G01S 5/0045; G01S 5/0063;
(Continued)

(56) References Cited

U.S. PATENT DOCUMENTS 8,412,456 B2 *  4/2013  Roh ........................ G01S 19/49
                                                    701/472
8,860,609 B2 * 10/2014  Roh ........................ G01S 19/40
                                                    701/500
(Continued)

FOREIGN PATENT DOCUMENTS

CN   106646570 A  *  5/2017  ............. G01S 19/47
CN   109085626 A  * 12/2018  ........... G01S 19/425

OTHER PUBLICATIONS

Apr. 23, 2021 International Search Report issued in International Patent Application No. PCT/EP2021/051693.
(Continued)

*Primary Examiner* — Chuong P Nguyen
(74) *Attorney, Agent, or Firm* — Williams Mullen; R. Brian Drozd

(57) ABSTRACT

Navigation device including an inertial navigation system coupled with a satellite navigation system, the information supplied by the satellite positioning system being used for adjusting the inertial navigation system, characterised in that the device further comprises means for measuring signals coming from base stations of a wireless cellular network, the satellite navigation system and the means for measuring signals coming from base stations of the wireless cellular network are coupled with each other by a tight coupling to
(Continued)

form a satellite navigator and/or base-station navigator implementing an estimator with simultaneous localisation and mapping, and in that the satellite navigation system and the means for measuring signals coming from base stations of the wireless cellular network are coupled to the inertial navigation system by a loose coupling for adjusting the inertial navigation system.

6 Claims, 8 Drawing Sheets

(51) Int. Cl.
G01S 19/46 (2010.01)
G01C 21/16 (2006.01)
G01S 19/45 (2010.01)
G01S 19/48 (2010.01)

(58) Field of Classification Search
CPC ... G01S 5/0263; G01S 5/0264; G01C 21/165; G01C 21/02
USPC ............. 342/357.28, 357.29, 357.31, 357.32
See application file for complete search history.

(56) References Cited

U.S. PATENT DOCUMENTS

| | | | | |
|---|---|---|---|---|
| 9,746,329 B2* | 8/2017 | Nichols | ................... | E02F 3/842 |
| 9,927,530 B2* | 3/2018 | Boyarski | ................. | G01S 19/47 |
| 10,578,743 B1* | 3/2020 | Kalathil | .................. | G01S 19/48 |
| 10,670,727 B2* | 6/2020 | Revol | ..................... | G01S 19/15 |
| 11,372,114 B2* | 6/2022 | Carcanague | ............ | G01S 19/20 |
| 11,860,260 B2* | 1/2024 | Carcanague | ............ | G01S 19/44 |
| 2016/0061614 A1* | 3/2016 | Lee | ........................ | G01C 21/28 |
| | | | | 701/446 |

OTHER PUBLICATIONS

Apr. 23, 2021 Written Opinion issued in International Patent Application No. PCT/EP2021/051693.

Javier Arribas et al. "A Technology-Agnostic GNSS/INS Real-Time Sensor Fusion Platform With Ultra Wide Band Cooperative Distance Measurements for Terrestrial Vehicle Navigation". GNSS 2018—Proceedings of the 31st International Technical Meeting of the Satellite Division of the Institute of Navigation (Ion GNSS+ 2018), The Institute of Navigation, 8551 Rixlew Lane Suite 360 Manassas, VA, 20109, USA, Sep. 28, 2018, pp. 1967-1984.

"Satellite Earth Stations and Systems (ses); Global Navigation Satellite System (GNSS) Based Location Systems; Minimum Performance and Features". Technical Report, European Telecommunications Standards Institute (ETSI), 650, Route des Lucioles; F-06921 Sophia-Antipolis; France, vol. SES SCN, No. V1.1, Sep. 1, 2012.

* cited by examiner

NAVIGATION METHOD AND SYSTEM

TECHNICAL FIELD

The invention relates to a navigation method and system.

PRIOR ART

The use of inertial navigation systems, referred to as INS systems, is at the present time conventional, in particular in the field of air and sea navigation. INS systems are thus habitually installed in vehicles, such as aircraft or ships. INS systems use various sensors such as accelerometers or gyrometers. These sensors provide measurements (measurements of rotation, acceleration, etc.) an integration of which makes it possible to determine an attitude, a speed and a position of the vehicle during movement.

These sensors are however imperfect and have intrinsic errors or measurement biases liable to vary during a movement. These sensors are moreover subject to measurement noise.

One consequence of these imperfections is that INS systems prove to be precise over a short period but are, in the longer term, subject to significant drifts.

To overcome these drifts, some INS systems are coupled with a satellite positioning system of the GNSS type (Global Navigation Satellite System), referred to as GNSS system hereinafter, such as a GPS system (Global Positioning System), GLONASS (the Russian satellite navigation system), Galileo (the future European satellite navigation system) or Beidou (the future Chinese satellite navigation system). A so-called GNSS/INS hybrid system is then obtained, as described for example in the document EP2245479.

In a GNSS/INS hybrid system, the information supplied by the GNSS system is generally used to adjust the INS system. Conventionally, this adjustment is performed by means of a Kalman filter that optimises the navigation performances by estimating the respective errors of the GNSS system and of the INS system.

Two types of coupling are then distinguished: loose coupling and tight coupling.

In loose coupling, in addition to receiving navigation solutions (positions, speeds) of the INS system, the Kalman filter receives as an input navigation solutions (positions, speeds) supplied by the GNSS system.

In tight coupling, the GNSS system supplies as an input of the Kalman filter raw data such as pseudo-distances or pseudo-speeds in place of the navigation solutions.

At the present time, a majority of the GNSS/INS hybrid navigation systems use loose coupling because of its simplicity of implementation.

However, to be able to provide a navigation solution, a GNSS system must capture signals from at least a predetermined number of satellites, referred to as GNSS satellites, in general equal to four. In some environments, such as urban environments, the reception of the satellite signals is disturbed, which may at least temporarily prevent the GNSS system for capturing the predetermined number of GNSS satellites necessary for determining a navigation solution. These disturbances are in particular related to maskings of the GNSS satellites, multipaths and interference. When it encounters such disturbances, a GNSS system may be incapable of providing a navigation solution at the input of the Kalman filter. Without assistance from the GNSS system, a GNSS/INS hybrid system then becomes a simple INS system.

One advantage of a GNSS/INS hybrid system with tight coupling is that, even in the case of a number of GNSS satellites accessible to the GNSS system below the predetermined number of GNSS satellites, the GNSS/INS hybrid system can profit from the provision of the raw data supplied by the GNSS system for determining an improved navigation solution compared with an INS system alone. However, the management of the raw GNSS data, e.g. the calculation of correction of the clocks of the GNSS satellites, of the positions and of the speeds from ephemeris data, makes the GNSS/INS tight-coupling hybrid systems substantially more complex than the loose-coupling GNSS/INS hybrid systems. It is desirable to overcome these drawbacks of the prior art. It is in particular desirable to propose a method and a system that make it possible to overcome the defects of a loose-coupling GNSS/INS hybrid navigation system while keeping a complexity less than a tight-coupling GNSS/INS hybrid navigation system.

DISCLOSURE OF THE INVENTION

According to a first aspect, the present invention relates to a navigation device comprising an inertial navigation system coupled with a satellite navigation system, the information supplied by the satellite positioning system being used for adjusting the inertial navigation system, characterised in that the device further comprises means for measuring signals coming from base stations of a wireless cellular network, the satellite navigation system and the means for measuring signals coming from base stations of the wireless cellular network are coupled with each other by a tight coupling to form a satellite navigator and/or base-station navigator implementing an estimator with simultaneous localisation and mapping, and in that the satellite navigation system and the means for measuring signals coming from base stations of the wireless cellular network are coupled to the inertial navigation system by a loose coupling for adjusting the inertial navigation system.

The invention also relates to a navigation method comprising an inertial navigation system coupled with a satellite navigation system, the information supplied by the satellite positioning system being used for adjusting the inertial navigation system, characterised in that the method comprises the steps of:
  measuring signals coming from base stations of a wireless cellular network,
  coupling by tight coupling of the satellite navigation system and means for measuring signals coming from base stations of the wireless cellular network to form a satellite navigator and/or base-station navigator implementing an estimator with simultaneous localisation and mapping,
  coupling by loose coupling of the satellite navigation system of the means for measuring signals coming from the base station of the wireless cellular network to the inertial navigation system to adjust the inertial navigation system.

Thus the present invention makes it possible to potentially have the largest amount of information available (GNSS and/or 5G) within a hybridisation architecture based on a loose coupling of the pseudo-distance information adjusting the inertial navigation and relying on a GNSS/5G tight coupling structure that makes it possible to optimise to the maximum possible extent the merging of the raw information coming from the two satellite sources via GNSS and 5G receivers.

According to a particular embodiment of the invention, the satellite and/or base station navigator operates in three operating modes, the first mode, referred to as mapping mode, being a mode wherein the pseudo-distances, pseudo-speeds and carrier-to-noise ratios of the signals coming from base stations of the wireless cellular network and signals from the satellites are available, the second mode, referred to as 5G mode, being a mode wherein pseudo-distances, pseudo-speeds and carrier-to-noise ratios of the signals coming solely from base stations of the wireless cellular network are available, and the third mode, referred to as standard, being a mode wherein pseudo-distances, pseudo-speeds and carrier-to-noise ratios of the signals solely of the signals of the satellites are available.

Thus a maximum quality of a continuous navigation function is obtained when only the GNSS is available or when only the cellular network is available or when the GNSS and the cellular network are available.

According to a particular embodiment of the invention, the device further comprises a matrix-generating module that forms a plurality of matrices comprising a transition matrix, a Jacobian matrix, a measurement-noise covariance matrix and a process-noise covariance matrix.

Thus, according to a particular embodiment of the invention, for each operating mode, the matrix-generating module forms a transition matrix, a Jacobian matrix, a measurement-noise covariance matrix and a process-noise covariance matrix that are different from the matrices formed for the other modes.

According to a particular embodiment of the invention, the navigation device comprises a Kalman filter.

According to a particular embodiment of the invention, the method comprises the step of determining an operating mode of the satellite and/or base-station navigator among three operating modes, and the first mode is a mode wherein pseudo-distances, pseudo-speeds and carrier-to-noise ratios of the signals coming from base stations of the wireless cellular network and signals from the satellites are available, the second mode is a mode wherein pseudo-distances, pseudo-speeds and carrier-to-noise ratios of the signals coming from base stations of the wireless cellular network are available and the third mode is a mode wherein pseudo-distances, pseudo-speeds and carrier-to-noise ratios of the signals of the signals of the satellites are available.

According to a particular embodiment of the invention, the method furthermore comprises a matrix-generating step that forms a plurality of matrices comprising a transition matrix, a Jacobian matrix, a measurement-noise covariance matrix and a process-noise covariance matrix.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention is described hereinafter in a maritime context wherein a navigation system implementing a method according to the invention is transported by a vehicle or carrier of the ship type. The invention could just as well apply in a different context such as an air or road context, the vehicle transporting the navigation system according to the invention being able to be an aircraft, a drone, a car or a lorry.

Figure 1:
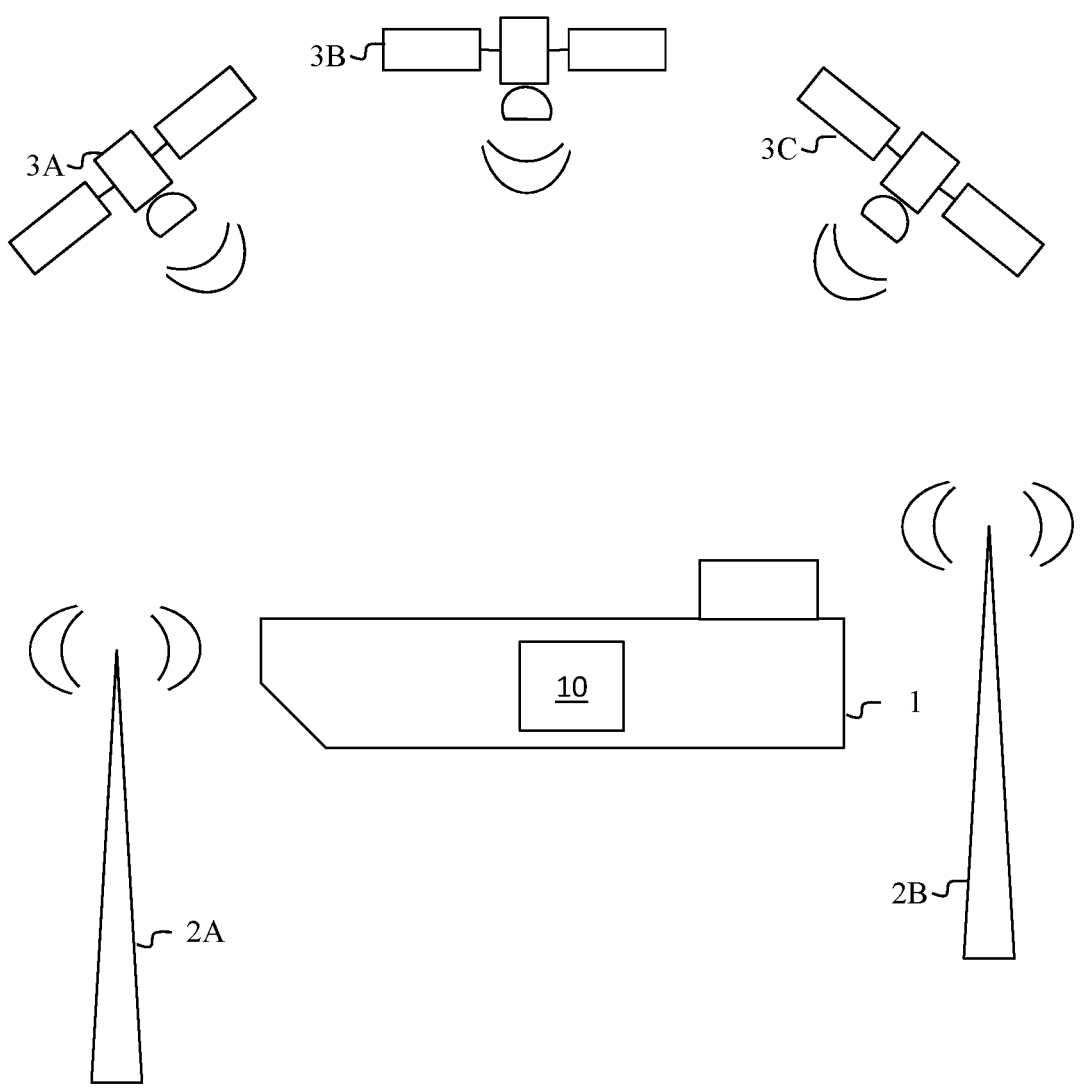
FIG. 1 illustrates a context wherein the invention is implemented.

FIG. 1 illustrates a context wherein the invention is implemented. In FIG. 1, a ship 1 is moving in an environment comprising satellites (here satellites 3A, 3B and 3C are shown) of a constellation of GNSS satellites and base stations of a fifth generation cellular wireless communication system, referred to as 5G base stations (here two 5G base stations are shown). The ship 1 comprises a hybrid navigation system 10 with loose coupling between an INS system and a tight coupling GNSS/5G hybrid system, simply referred to as a GNSS/5G+INS hybrid navigation system hereinafter.

In one embodiment, the base stations could just as well be the base stations of a fourth generation telephony system (referred to as 4G base stations, or a set consisting of 5G base stations and 4G base stations.

Figure 2:
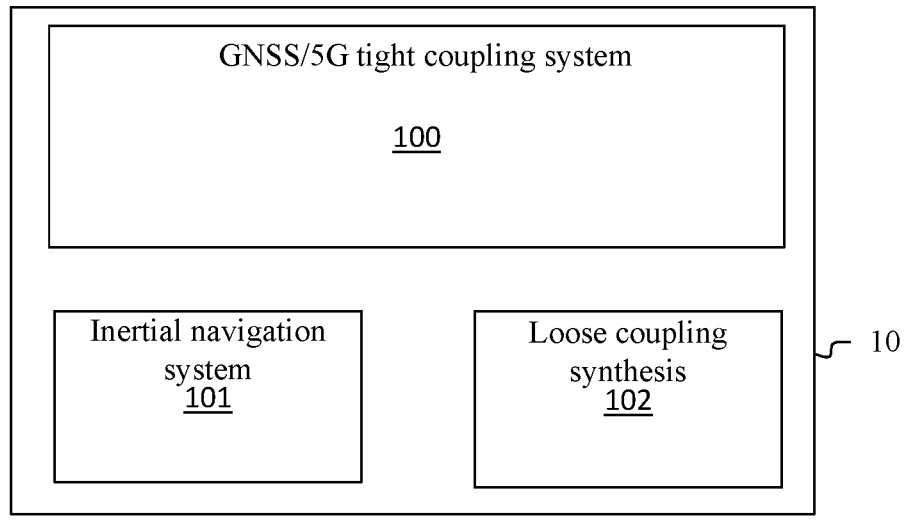
FIG. 2 illustrates schematically a hybrid navigation system with loose coupling between an INS system and a GNSS/5G tight coupling system according to the invention.

FIG. 2 illustrates schematically the GNSS/5G+INS hybrid navigation system 10.

The GNSS/5G+INS hybrid navigation system 10 of FIG. 2 comprises a GNSS/5G tight coupling system 100, an INS system 101 and a loose coupling system 102. The various couplings are described hereinafter.

In one embodiment, the loose coupling system 102 receives corrected measurements from the INS system 101 and navigation solutions from the GNSS/5G tight coupling system 100.

Figure 3:
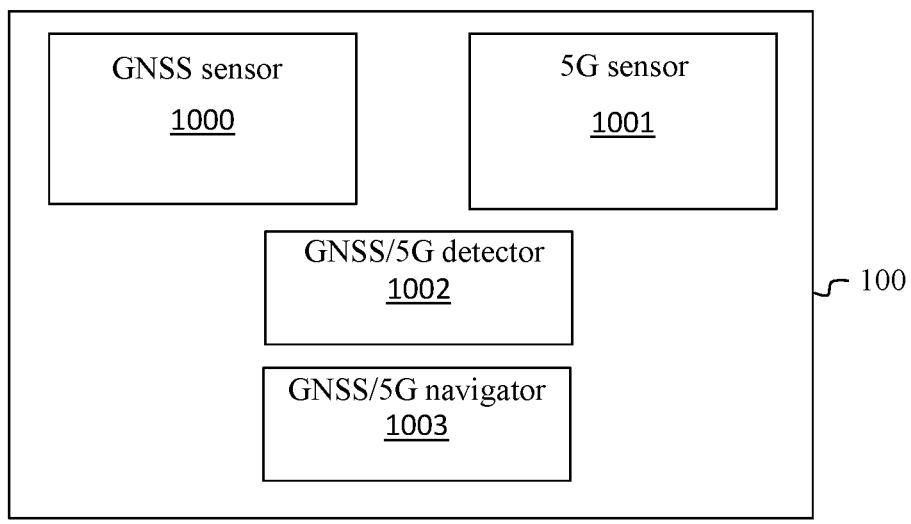
FIG. 3 illustrates schematically a GNSS/5G tight coupling system.

In another embodiment, the loose coupling system 102 receives measurements from the INS system 101 and navigation solutions from the GNSS/5G tight coupling system 100 and, from this information, generates residual errors that it takes as an input measurement. FIG. 3 illustrates schematically the GNSS/5G tight coupling system 100.

The GNSS/5G tight coupling system 100 comprises a GNSS sensor 1000, a 5G sensor 1001, a GNSS/5G detector 1002 and a GNSS/5G navigator 1003.

The GNSS/5G detector 1002 defines, according to the output data that it receives, whether the GNSS/5G tight coupling system 100 can use only GNSS data, only 5G data or 5G data and GNSS data. The GNSS/5G detector 102 thus defines the mapping or 5G or standard operating mode.

The GNSS/5G navigator 1003 is based on a SLAM Kalman filter which, according to the operating mode, configures the SLAM Kalman filter. Thus the GNSS/5G navigator 1003 defines, for each of the modes, the state and observation vectors, the matrices of the Kalman filter and more particularly their dimension.

A major advantage of the GNSS/5G tight coupling system 100 is that it uses a tight coupling between the GNSS sensor 1000 and the 5G sensor 1001, thus allowing a deployment in a navigator (i.e. the GNSS/5G navigator 1003) common to the GNSS sensor 1000 and to the 5G sensor 1001, of a SLAM (Simultaneous Localisation and Mapping) estimator. The SLAM estimator is capable of simultaneously estimating states (i.e. positions, clock states) of the 5G base stations, and navigation solutions (i.e. positions, speeds and clock state) of the GNSS/5G tight coupling system 100. Thus, as long as the GNSS/5G tight coupling system 100 captures at least a predetermined number of GNSS satellites $N_{sat}$ (in general $N_{sat}=4$), it is capable of estimating the states (positions and clock states) of the 5G base stations. The GNSS/5G tight coupling system 100 therefore does not require external additional means for determining the positions and clock states of the 5G base stations. Once the states of the 5G base stations are known, when the number of satellites captured by the GNSS/5G tight coupling system 100 is less than $N_{sat}$, the GNSS/5G tight coupling system is capable of providing a navigation solution by compensating for the absence of GNSS signals by measurements coming from the 5G sensor 1001.

Figure 4:
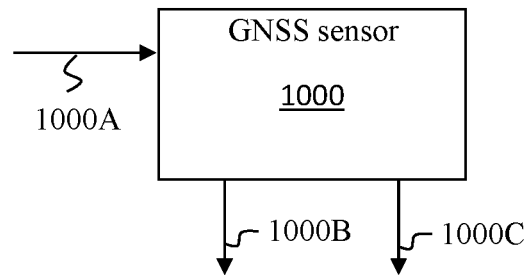
FIG. 4 illustrates schematically a GNSS system.

The navigation solutions determined by the GNSS/5G tight coupling system 100 are next combined with measurements from the INS system 101 in the loose coupling system 102 to produce an improved navigation system and to correct any errors of the INS system 101. FIG. 4 illustrates schematically the GNSS sensor 1000. The GNSS sensor 1000 receives radio-frequency (RF) signals 1000A from GNSS satellites. For each RF signal received from a GNSS satellite with sufficient quality, the GNSS sensor 1000 generates output data 1000B, referred to as GNSS output data, comprising pseudo-distances and pseudo-speeds, referred to as GNSS pseudo-distances and pseudo-speeds, and a carrier-to-noise ratio $C/N_0$, referred to as GNSS $C/N_0$ ratio, corresponding to said RF signal and estimations 1000C of the position of said GNSS satellite.

Figure 5:
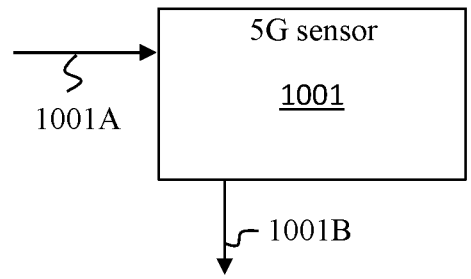
FIG. 5 illustrates schematically a 5G system.

FIG. 5 illustrates schematically the 5G sensor 1001. The 5G sensor 1001 receives RF signals, referred to as 5G signals 1001A from 5G base stations. For each RF signal received from a 5G base station with sufficient quality, the 5G sensor 1001 generates output data, referred to as 5G output data, comprising estimations 1001B of pseudo-distances and pseudo-speeds, referred to as 5G pseudo-distances and pseudo-speeds, and of a carrier-to-noise ratio $C/N_0$, referred to as 5G $C/N_0$ ratio, corresponding to said RF signal.

Figure 6:
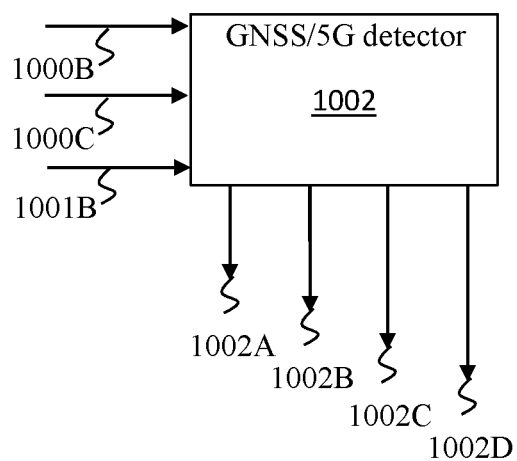
FIG. 6 illustrates schematically a GNSS/5G detector.

FIG. 6 illustrates schematically the GNSS/5G detector 1002.

The GNSS/5G detector 1002 receives the GNSS and 5G output data comprising:
 the estimations 1000B of the GNSS pseudo-distances and pseudo-speeds and of the GNSS ratios $C/N_0$;
 the estimations 1000C of the positions of the GNSS satellites; and
 the estimations 1001B of the 5G pseudo-distances and pseudo-speeds and of the 5G $C/N_0$ ratios.

The GNSS/5G detector 1002 then fulfils two roles. Its first role is to synchronise the GNSS output data with the 5G output data when the two types of data are available. For example, if several 5G output data are collected between two collections of GNSS output data, the 5G output data are averaged to reflect the average 5G output data over an interval of time corresponding to the two collections of GNSS output data. The second role of the GNSS/5G detector 1002 is to define, according to the output data that it receives, whether the GNSS/5G tight coupling system 100 can use only GNSS data, only 5G data, or 5G data and GNSS data. The type of data used makes it possible to define an operating mode of the GNSS/5G+INS hybrid system 10 among a plurality of possible operating modes. The plurality of operating modes comprises a so-called mapping mode, a so-called 5G mode and a so-called standard (GNSS) mode. In the mapping mode, GNSS and 5G pseudo-distances, pseudo-speeds and $C/N_0$ ratios are available in a sufficient number.

In 5G mode, only the 5G pseudo-distances, pseudo-speeds and $C/N_0$ ratios are available.

In the standard mode, only the GNSS pseudo-distances, pseudo-speeds and $C/N_0$ ratios are available.

The GNSS/5G detector 1002 then supplies as an output measurements 1002A of GNSS and/or 5G pseudo-speeds and pseudo-distances of the GNSS/5G tight coupling system 100, estimations 1002B of the GNSS and/or 5G $C/N_0$ ratios corresponding to the measurements 1002A, positions of the GNSS satellites 1002C corresponding to the measurements 1002A and an identifier 1002D indicating the data to be used by the GNSS/5G tight coupling system 100 (GNSS or 5G or GNSS and 5G).

Figure 7:
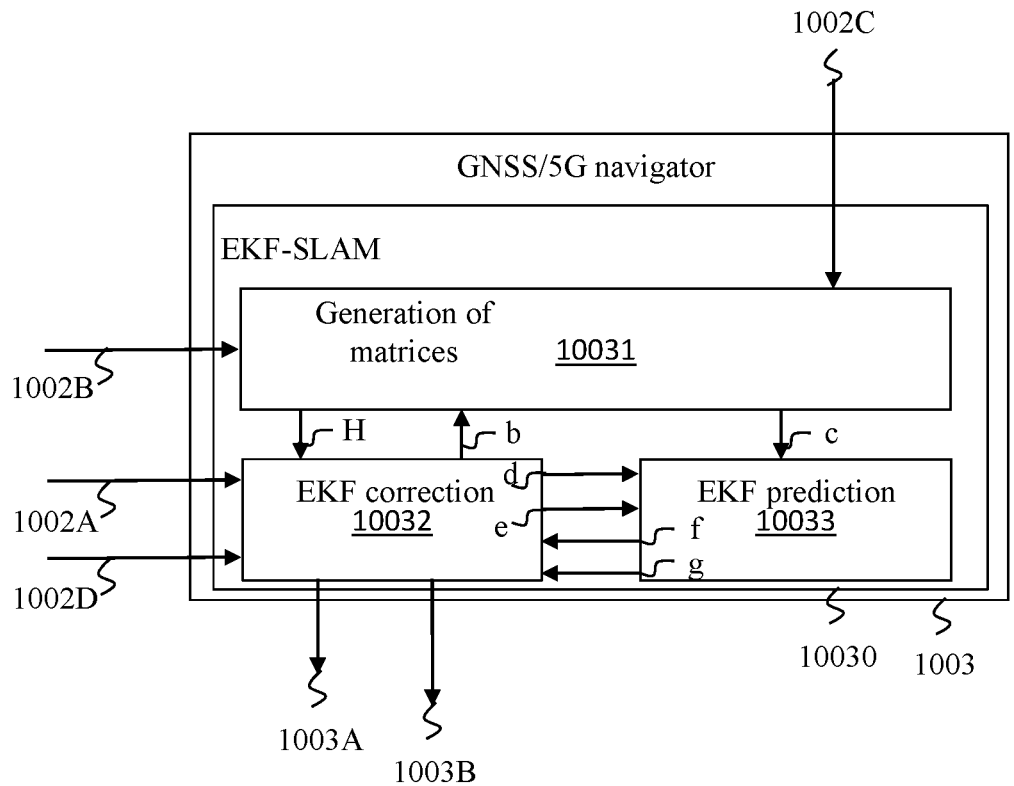
FIG. 7 illustrates schematically a GNSS/5G navigator.

FIG. 7 illustrates schematically the GNSS/5G navigator 1003.

The GNSS/5G navigator 1003 uses the algorithm that will be described with reference to FIG. 12.

As mentioned above in relation to FIG. 2, the GNSS/5G navigator 1003 comprises a SLAM estimator. It is normal to use an extended Kalman filter (EKF), referred to as a EKF filter hereinafter, to solve a SLAM problem. The GNSS/5G navigator 1003 therefore comprises a module, referred to as a EKF-SLAM module 10030 solving the SLAM problem of the invention.

The EKF-SLAM module 10030 comprises a matrix-generating module 10031, a correction module, referred to as an EKF correction module, 10032 and a prediction module, referred to as an EKF prediction module, 0033.

The matrix-generating module 10031 is responsible for forming and using the positions of the satellites, the position and speed of the GNSS/5G tight coupling system 100 and the positions of 5G base stations, a plurality of matrices used in the navigation method that we describe hereinafter. This plurality of matrices comprises:
 a transition matrix F;
 a Jacobian matrix H;
 a measurement-noise covariance matrix R;
 a process-noise covariance matrix Q.

The matrix-generating module 10031 receives as an input the estimations 1002B of the GNSS and/or 5G $C/N_0$ ratios, the positions of the GNSS satellites 1002C and corrected estimations b of GNSS and/or 5G pseudo-speeds and pseudo-distances of the GNSS/5G tight coupling system 100 supplied by the EKF correction module 10032.

From these data received as an input, the matrix-generating module 10031 supplies the Jacobian matrix H at the input of the EKF correction module 10032, and the matrices F, H, R and Q (reference c in FIG. 7) at the input of the EKF prediction module 10033.

The EKF correction module 10032 receives as an input the estimations 1002A of GNSS and/or 5G pseudo-speeds and pseudo-distances of the GNSS/5G tight coupling system 100, the identifier 1002D indicating the data to be used by the GNSS/5G tight coupling system 100, the Jacobian matrix H and, coming from the EKF prediction module 10033, a prediction f of an error state vector of the GNSS/5G tight coupling system 100 and a prediction g of an error covariance matrix associated with said state vector.

From these data, the EKF correction module 10032 supplies to the EKF prediction module 10033 an a posteriori estimate (i.e. after correction) d of the error state vector of the GNSS/5G tight coupling system and an a posteriori estimate e of the error covariance matrix associated with said state vector. Moreover, the EKF correction module 10032 generates an identifier 1003A indicating an operating mode of the GNSS/5G tight coupling system 100 and a navigation solution (referred to as GNSS/5G navigation solution, 1003B.

The EKF prediction module 10033 receives as an input the matrices F, H, R and Q (reference c), the a posteriori estimate d of the error state vector of the GNSS/5G tight coupling system and the a posteriori estimate e of the error covariance matrix associated with said state vector.

From these data, the EKF prediction module 10033 supplies to the EKF correction module 10032 the prediction f of an error state vector of the GNSS/5G tight coupling system 100 and the prediction g of an error covariance matrix associated with said state vector.

Figure 8:
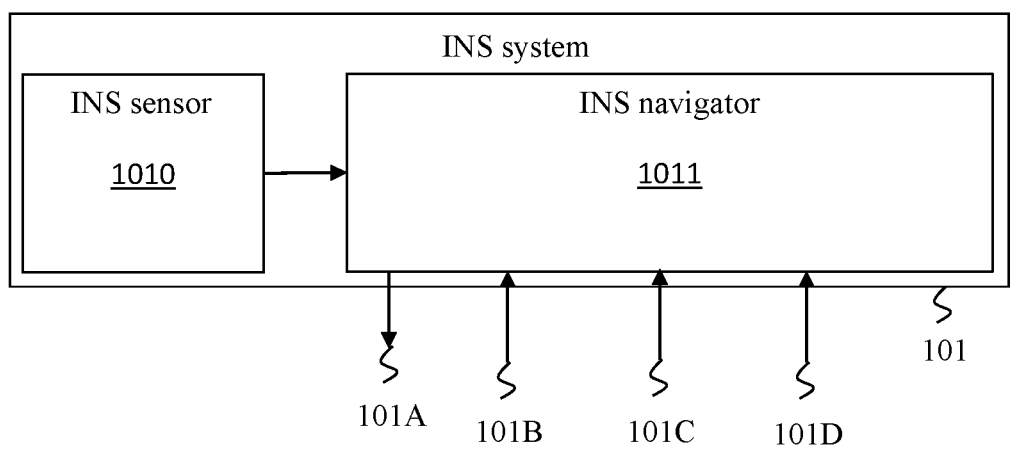
FIG. 8 illustrates schematically an INS navigation system.

FIG. 8 illustrates schematically the INS navigation system 101.

The INS navigation system 101 uses the algorithm that will be described with reference to FIG. 13.

The INS system 101 comprises an INS sensor 1010 and an INS navigator 1011. The INS sensor 1010 comprises for example at least one accelerometer and at least one gyrometer each providing measurements to the INS navigator 1011.

Like a conventional INS navigator, the INS navigator 1011 receives the measurements from the INS sensor 1010 and generates a navigation solution, referred to as INS navigation solution, 101A. However, the INS navigator 1011 also receives, from the loose coupling system 102, position and speed corrections 101D, attitude corrections 101C and corrections (bias, scale factor of the accelerometer and of the gyrometer) 101B to be applied to the measurements supplied by the INS sensor 1010.

Figure 9:
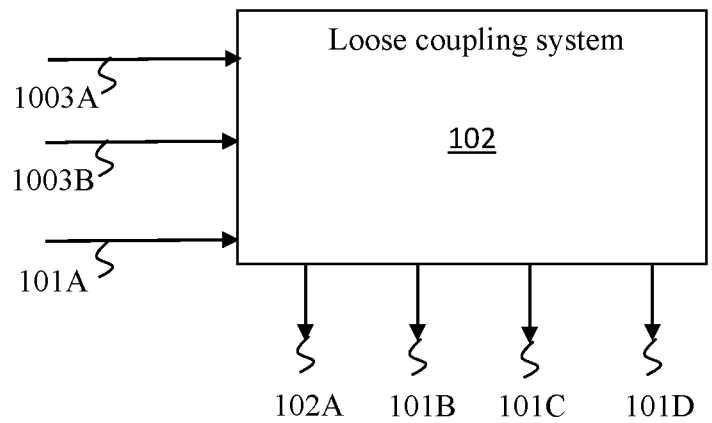
FIG. 9 illustrates schematically a loose coupling system.

FIG. 9 illustrates schematically the loose coupling system 102.

The loose coupling system 102 receives the identifier 1003A indicating the operating mode of the GNSS/5G tight coupling system 100 and the GNSS/5G hybrid navigation solution 1003B supplied by said GNSS/5G tight coupling system 100. The loose coupling system also receives the INS navigation solution 101A supplied by the INS system 101.

From these data, the loose coupling system 102 supplies the corrections 101B, 101C and 101D to the INS system 101 and generates a navigation solution, referred to as GNSS/5G+INS hybrid navigation solution 102A. The GNSS/5G+INS hybrid navigation solution is the navigation solution supplied by the GNSS/5G+INS hybrid navigation system 10.

Figure 10:
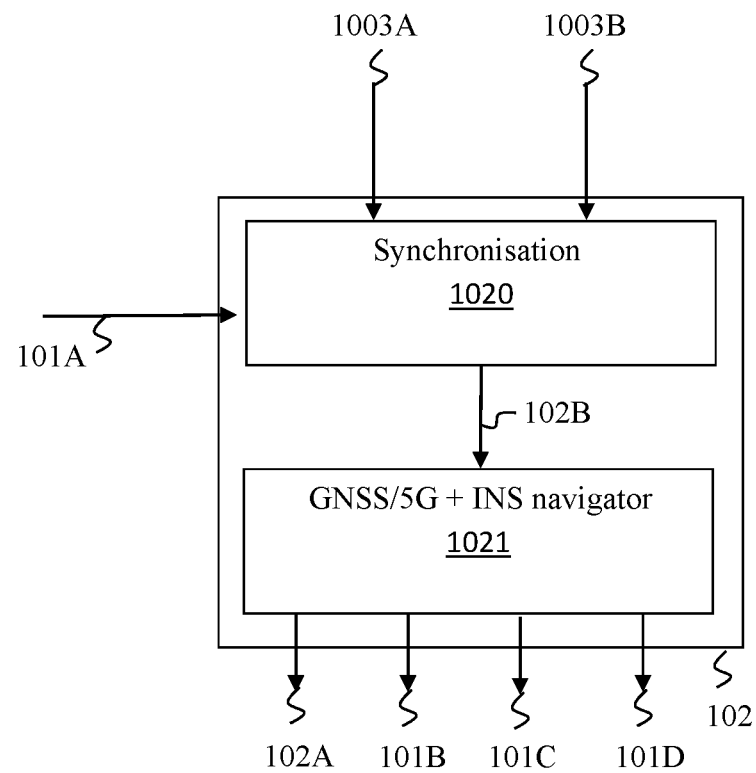
FIG. 10 illustrates schematically a loose coupling system between an INS system and a GNSS/5G tight coupling system.

FIG. 10 illustrates schematically a detail of the loose coupling system 102.

The loose coupling system 102 comprises a synchronisation module 1020 and a navigator, referred to as a GNSS/5G+INS navigator, 1021. The synchronisation module 1020 is responsible for supplying to the GNSS/5G+INS navigator 1021 navigation solutions 102B that it obtains from the navigation solutions 101A and 1003B coming respectively from the INS system 101 and from the GNSS/5G navigator 1003. However, the INS system 101 and the GNSS/5G tight coupling system 100 do not generally generate navigation solutions with the same frequency. The synchronisation module 1020 is then responsible for synchronising the INS navigation solutions with the GNSS/5G navigation solutions. For example, when the INS navigation solutions are supplied with a higher frequency than the GNSS/5G navigation solutions, the synchronisation module 1020 calculates GNSS/5G solutions that are intermediate between two GNSS/5G solutions supplied by the GNSS/5G tight coupling system 100, each intermediate GNSS/5G solution being aligned timewise on an INS solution supplied by the INS system 101. From these synchronised INS and GNSS/5G navigation solutions, the GNSS/5G+INS navigator 1021 generates corrections 101B, 101C and 101D and the GNSS/5G+INS hybrid navigation solutions 102A.

Figure 11:
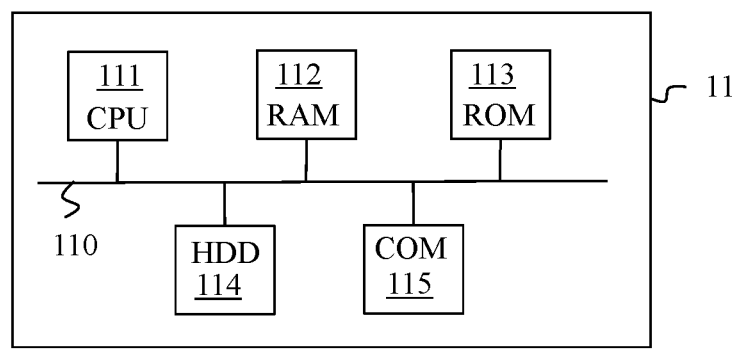
FIG. 11 illustrates schematically an example of a hardware architecture of a processing module.

FIG. 11 illustrates schematically an example of a hardware architecture of a processing module 11.

The modules included in the GNSS/5G+INS hybrid navigation system 10, including the GNSS/5G detector 1002, the matrix-generating module 10031, the EKF correction module 10032, the EKF prediction module 10033, the synchronisation module 1020, the GNSS/5G+INS navigator 1021, each comprise a processing module 11.

According to the example of hardware architecture shown in FIG. 11, the processing module 11 then comprises, connected by a communication bus 110: a processor or CPU (central processing unit) 111; a random access memory RAM 112; a read only memory ROM 113; a storage unit such as a hard disk or a storage medium reader, such as an SD (Secure Digital) card reader 114; at least one communication interface 115 enabling the processing module 11 to communicate with other modules in the GNSS/5G+INS hybrid navigation system 10.

The processor 111 is capable of executing instructions loaded in the RAM 112 from the ROM 113, from an external memory (not shown), from a storage medium (such as an SD card), or from a communication network. When the GNSS/5G+INS hybrid navigation system 10 is powered up, the processor 111 is capable of reading instructions from the RAM 112 and executing them. These instructions form a computer program causing the complete or partial execution, by the processor 111, of the methods executed by the GNSS/5G+INS hybrid navigation system modules 10 comprising said processing module 11.

These methods can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

For example, when the present invention is implemented in a ship in a port-approach phase or in a coming-alongside phase, the measurements determine the operating mode of the GNSS/5G+INS hybrid receiver 10. For example, when the GNSS measurements are partially masked and/or suffer partially from multipaths, the standard mode is selected.

When the GNSS measurements are completely or very strongly masked and/or completely suffer very greatly from multipaths, the 5G mode is selected.

When the 5G measurements are completely very greatly masked and/or completely suffer very greatly from multipaths, the INS/GNSS mode is selected.

In mapping mode, the GNSS and 5G pseudo-distances are available. The state vector of the EKF-SLAM estimator is made from the position, the speed, the bias and the drift of the clock of the receiver of the hybrid receiver, as well as positions, biases and clock drifts of the 5G stations.

Between the corrections, the EKF-SLAM estimator produces the state prediction $\hat{X}_k^-$ and the prediction error covariance $P_k^-$ by means of the transition models, as well as clock models of the receiver. When pseudo-distance and pseudo-speed measurements are available, the EKF-SLAM estimator produces an update $\hat{X}_k$ of the state estimate and an update $P_k$ of the associated estimation error covariance.

In 5G mode, only the 5G pseudo-distances are available. The state vector of the estimator is made from the position and from the speed of the receiver as well as from the difference between the biases and clock drifts of the receiver on the one hand and of each 5G station on the other hand.

The 5G mode considered here is a restricted mode in that the positions of the 5G base stations as well as the bias and the clock drift of the receiver estimated in the mapping mode are used. As soon as the GNSS measurements become available again, the bias and the clock drift as well as the positions of the 5G stations are reintroduced into the state vector and mapping mode is gone into again, thus making it possible to refine the positions of the 5G base stations.

Between the corrections, the EKF-SLAM estimator produces a state prediction $\hat{X}'^-_k$ and the prediction error covariance $P''^-_k$ by means of the transition models as well as clock models of the 5G base stations.

In GNSS mode, referred to as standard mode, only the GNSS pseudo-distances are available. The 5G measurements are unavailable following disturbances related either to the environment or to the absence of the 5G network.

The state vector of the EKF-SLAM estimator is made from the position, the speed, the bias and the drift of the clock of the receiver. Between the corrections, the EKF-SLAM estimator produces a state prediction $\hat{X}''^-_k$ and the prediction error covariance $P''^-_k$ by means of the transition models as well as clock models of the receiver. When measurements of GNSS and/or 5G pseudo-distances and pseudo-speeds are available, the EKF-SLAM estimator produces an update $\hat{X}_k$ of the state estimate and an update $P_k$ of the associated estimation error covariance.

Outside the modes, each 5G signal emanates from a spatially stationary base station and its state vector consists of its three-dimensional position coordinates $r_s=[x, y, z]^T$ and of its clock states $x_{hor,s}=[c\delta t_s, c\dot{\delta} t_s]$ where c is the celerity, $\delta t_s$ the clock bias of the 5G base station and $\dot{\delta}_s$ the clock drift of the 5G base station.

The dynamic range of the 5G signal is described by the following model: $(x_s)_{k+1} = F_s(x_s)_k + (w_s)_k$ where $x_s = [r_s^T, x_{hor,s}^T]^T$, $F_s = \text{diag}[I_{3\times3}, F_{Hor}]$, $w_s$ is the noise of the process modelled as white noise with zero mean and covariance $$Q_s = \text{diag}[0_{3+3}, c^2 Q_{hor,s}], F_{hor} = \begin{bmatrix} 1 & T \\ 0 & 1 \end{bmatrix},$$

$$Q_{hor,s} = \begin{bmatrix} S_{w\delta t_s}T + S_{w\dot{\delta}t_s}\dfrac{T^3}{3} & S_{w\dot{\delta}t_s}\dfrac{T^2}{2} \\ S_{w\dot{\delta}t_s}\dfrac{T^2}{2} & S_{w\dot{\delta}t_s}T \end{bmatrix}$$

and T is the constant sampling interval.

The terms $S_{w\delta t_s}$ and $S_{w\dot{\delta}t_s}$ are the process noise spectra of the bias and of the clock drift of the 5G station respectively.

The terms $S_{w\delta t_s}$ and $S_{w\dot{\delta}t_s}$ can be associated with the power law coefficients, $\{h_\alpha\}_{\alpha=-2}^2$, which were demonstrated during laboratory experiments as characterising the power spectral density of the fractional frequency-difference values y(t) of an oscillator with respect to the nominal frequency according to $S_y(f) = \sum_{\alpha=-2}^2 h_\alpha f^\alpha$. A usual approximation uses only the parameters $h_0$ and $h_{-2}$, so that $$S_{w\delta t_s} \approx \frac{h_{0_s}}{2} \text{ and } S_{w\dot{\delta}t_s} \approx 2\pi^2 h_{-2_s}.$$

A state vector $x_r$ of the GNSS/5G tight coupling system 100 consists of three-dimensional position coordinates $r_r = [X,Y,Z]^T$ of said system 100, a three-dimensional speed of said system 100 $\dot{r}_r = [\dot{X},\dot{Y},\dot{Z}]^T$ and clock states of the receiver $x_{hor,r} = [c\delta t_r, c\dot{\delta} t_r]^T$: $x_r = [r_r^T, \dot{r}_r^T, x_{hor,r}^T]$ The states of the receiver change over time in the following manner:

$$(x_r)_{k+1} = F_r(x_r)_k + (w_r)_k$$

$$\text{where } F_r = \begin{bmatrix} I_{3\times3} & T \cdot I_{3\times3} & 0_{3\times2} \\ 0_{3\times3} & I_{3\times3} & 0_{3\times2} \\ 0_{2\times3} & 0_{2\times3} & \begin{bmatrix} 1 & T \\ 0 & 1 \end{bmatrix} \end{bmatrix},$$

T is the constant sampling interval of the measurements, $w_r$ is the process noise vector model as modelled as a white noise with zero mean and covariance $Q_r = \text{diag}[Q_{pv}, c^2 Q_{hor,r}]$. diag denotes the diagonal concatenation of blocks of matrices.

$$Q_r = \begin{bmatrix} S_p\dfrac{T^3}{3} & 0 & 0 & S_p\dfrac{T^2}{2} & 0 & 0 & 0 & 0 \\ 0 & S_p T & 0 & 0 & S_p\dfrac{T^2}{2} & 0 & 0 & 0 \\ S_p\dfrac{T^2}{2} & 0 & S_p T & 0 & 0 & 0 & 0 & 0 \\ 0 & 0 & 0 & S_p\dfrac{T^3}{3} & 0 & S_p\dfrac{T^2}{2} & 0 & 0 \\ 0 & S_p\dfrac{T^2}{2} & 0 & 0 & S_p\dfrac{T^3}{3} & 0 & 0 & 0 \\ 0 & 0 & 0 & S_p\dfrac{T^2}{2} & 0 & S_p T & 0 & 0 \\ 0 & 0 & 0 & 0 & 0 & 0 & c^2 S_{w\delta t_r}T + c^2 S_{w\dot{\delta}t_r}\dfrac{T^3}{3} & c^2 S_{w\dot{\delta}t_r}\dfrac{T^2}{2} \\ 0 & 0 & 0 & 0 & 0 & 0 & c^2 S_{w\dot{\delta}t_r}\dfrac{T^2}{2} & c^2 S_{w\dot{\delta}t_r}T \end{bmatrix},$$

$$Q_{hor,r} = \begin{bmatrix} S_{w\delta t_r}T + S_{w\dot{\delta} t_r}\frac{T^3}{3} & S_{w\dot{\delta} t_r}\frac{T^2}{2} \\ S_{w\dot{\delta} t_r}\frac{T^2}{2} & S_{w\dot{\delta} t_r}T \end{bmatrix},$$

$$Q_{pv} = \begin{bmatrix} S_p\frac{T^3}{3} & 0 & 0 & S_p\frac{T^2}{2} & 0 & 0 \\ 0 & S_pT & 0 & 0 & S_p\frac{T^2}{2} & 0 \\ S_p\frac{T^2}{2} & 0 & S_pT & 0 & 0 & 0 \\ 0 & 0 & 0 & S_p\frac{T^3}{3} & 0 & S_p\frac{T^2}{2} \\ 0 & S_p\frac{T^2}{2} & 0 & 0 & S_p\frac{T^3}{3} & 0 \\ 0 & 0 & 0 & S_p\frac{T^2}{2} & 0 & S_pT \end{bmatrix}$$

$S_p$ is the speed noise power spectrum, $S_{w\delta t_r}$ and $S_{w\dot{\delta} t_r}$ are the power spectra of the process noises of the bias and of the clock drift of the receiver respectively with $$S_{w\delta t_r} = \frac{h_{0_r}}{2} \text{ and } S_{w\dot{\delta} t_r} \approx 2\pi^2 h_{-2_r}.$$

For example, for a clock using a quartz oscillator, $h_0=2^{-19}$ seconds, and $h_{-2}=2^{-20}$ Hz.

The observation of pseudo-distance made by the GNSS/5G receiver on the $n^{th}$ 5G base station at the instant k is linked to the states of the receiver and of the 5G base station:

$$(z_{s_n})_k = (\|r_r - r_{s_n}\|^2 + c \cdot [\delta t_r - \delta t_{s_n}])_k + (v_{s_n})_k$$

where $r_r=[X, Y, Z]^T$ is the position of the receiver, $r_{s_n}=[x, y, z]^T$ is the position of the $n^{th}$ 5G gNodeB, $v_{s_n}$ is modelled as a Gaussian white noise with zero mean and variance $\sigma_\alpha^2$.

The observation of pseudo-speed (delta-distance) made by the GNSS/5G receiver with respect to the $n^{th}$ 5G base station at the instant k is linked to the states of the receiver and of the 5G base station by:

$$(\dot{z}_{s_n})_k = \left( \frac{1 - \frac{1}{c}[V_{s_n} - \dot{r}_r \cdot \hat{a}_{s_n}^T]}{1 + (\dot{\delta}t_r - \dot{\delta}t_{s_n})} \lambda \right)_k + (w_{s_n})_k \text{ where } \hat{a}_{s_n}^T \cong \frac{r_r - r_{s_n}}{\|r_r - r_{s_n}\|}$$

is the LOS vector of the 5G base station at the receiver, $\dot{r}_r=[\dot{X}, \dot{Y}, \dot{Z}]^T$ is the predicted speed of the receiver, $V_{s_n}=0$ is the zero speed of the 5G transmitter as it is stationary in this framework, c is the celerity, $\dot{\delta}t_r$ the clock drift of the receiver and $\dot{\delta}t_s$ the clock drift of the 5G station, $\lambda$ is the wavelength of the nominal carrier frequency of the 5G base station, $w_{s_n}$ is a Gaussian white noise with zero mean and variance $\sigma_\beta^2$.

The observation of pseudo-distance made by the GNSS/5G receiver on the $m^{th}$ GNSS satellite after correction of the ionospheric and tropospheric delays is given by:

$$(z_{sv_m})_k = (\|r_r - r_{sv_m}\|^2 + c \cdot [\delta t_r - \delta t_{sv_m}])_k + (v_{sv_m})_k$$

where $z_{sv_m}=z_{sv_m}' - c\delta t_{iono} - c\delta t_{tropo}$, $\delta t_{iono}$ and $\delta t_{tropo}$ are the ionospheric and tropospheric delays respectively, $z_{sv_m}'$ is the uncorrected pseudo-distance, and $v_{sv_m}$ is modelled as a Gaussian white noise with zero mean and variance $\sigma_\gamma^2$.

The observation of pseudo-speed (delta-distance) made by the GNSS/5G receiver with respect to the $m^{th}$ GNSS satellite at the instant k is linked to the states of the receiver by:

$$(\dot{z}_{sv_m})_k = \left( \frac{1 - \frac{1}{c}[V_{sv_m} - \dot{r}_r \cdot \hat{a}_{sv_m}^T]}{1 + (\dot{\delta}t_r - \dot{\delta}t_{sv_m})} \lambda_L \right)_k + (w_{sv_m})_k \text{ where } \hat{a}_{sv_m}^T \cong \frac{r_r - r_{sv_m}}{\|r_r - r_{sv_m}\|}$$

is the LOS vector of the satellite at the receiver, $\dot{r}_r=[\dot{X}, \dot{Y}, \dot{Z}]^T$ is the predicted speed of the receiver, $V_{sv_m}$ is the speed of the satellite, c is the celerity, $\dot{\delta}t_r$ the clock drift of the receiver and $\dot{\delta}t_s$ the clock drift of the satellite, $\lambda_L$ is the wavelength of the nominal carrier frequency of the satellite, $w_{sv_m}$ is a Gaussian white noise with zero mean and variance $\sigma_\delta^2$.

The navigation algorithm uses an extended Kalman filter as estimator with an addition of complexity related to the fact that the states of the base stations $\{x_{sn}\}_{n=1}^N$ are simultaneously estimated with the states of the GNSS/5G receiver.

In the mapping mode, the extended Kalman filter (EKF) produces an estimate $\hat{x}_k \cong E[x_k | \{Z_i\}_{i=1}^k]$ of $x_k$, and an error covariance estimate $P_k \cong E[\Delta x_k \Delta x_k^T]$ where $x_k \cong [x_r^T, x_{s_1}^T, \ldots, x_{s_N}^T]^T$, $Z_k \cong [z_{sv}^T, z_s^T]^T$, $z_{sv} \cong [z_{sv_1}, \ldots, z_{sv_M}, \dot{z}_{sv_1}, \ldots, \dot{z}_{sv_M}]^T$, $z_s = [z_{s_1}, \ldots, z_{s_N}, \dot{z}_{s_1}, \ldots, \dot{z}_{s_N}]^T$, and k is the last instant at which measurements were taken. In the implementation of the EKF estimator, the position, speed, bias and clock drift errors of the receiver, and the position, bias and clock drift errors of the 5G base stations are estimated. The states are subsequently updated at the instant k by adding the errors estimated at the instant k to the states estimated at the instant k−1, i.e.

$$\hat{x}_k = \hat{x}_{k-1} + \Delta x_k.$$

The state vector of the EKF estimator $\Delta x_k \cong x - \hat{x}_k$ at the instant k, x being the true vector of parameters to be estimated and $\hat{x}_k$ being the estimate of the parameter vector is given by $$\Delta x_k = [\Delta r_r^T, \Delta \dot{r}_r^T, \Delta x_{hor,s}^T, \Delta r_{s1}^T, \Delta x_{hor,s1}^T, \ldots, \Delta x_{hor,sN}^T]^T$$

where the position, speed and clock states are defined in the form of conventional additive error. To simplify the notation, we shall consider that the estimated error state vector is denoted $\hat{X}_k$ for the a posteriori estimation or $\hat{X}_k^-$ for the a priori estimation instead of $\Delta x_k$. The a posteriori estimate of the error state vector of the EKF estimator at the instant k is then denoted as follows: $\hat{X}_k = [\hat{r}_r^T, \dot{\hat{r}}_r^T, \hat{x}_{hor,r}^T, \hat{r}_{s1}^T, \hat{x}_{hor,s1}^T, \ldots, \hat{x}_{hor,sN}^T]^T$ In the 5G mode, the measurements $z_{sv}$ are not available. The estimates of the clock states of the receiver $\hat{x}_{hor,r}$ and the position states of the 5G base stations $\hat{r}_{sn}$ are no longer calculated but the biases relating to 5G clocks with respect to the clock of the receiver $\Delta\delta t_n \cong \delta t_r - \delta t_{sn}$, with n=1 to N, are estimated.

At the instant $t_0$ the states $\hat{x}_{hor,r}$, $\{\hat{r}_{sn}\}_{n=1}^N$ and $\{\hat{x}_{hor,sn}\}_{n=1}^N$ are removed from the estimator and the estimates of the relative clock states $\Delta\hat{x}_{horn}$ are initialised in the following manner: $\Delta\hat{x}_{horn} = [\Delta\hat{\delta}t_n, \Delta\hat{\dot{\delta}}t_n]^T$, n=1 to N with $\Delta\hat{\delta}_n \cong \hat{\delta}t_r - \hat{\delta}t_{sn}$ and $\Delta\hat{\dot{\delta}}t_n \cong \Delta\hat{\dot{\delta}}t_r - \Delta\hat{\dot{\delta}}t_{sn}$.

The difference between the clock state vectors of the receiver and of the base station $\Delta x_{hor} \cong x_{hor,r} - x_{hor,s}$ change in accordance with the equation $(\Delta x_{hor})_{k+1} \cong (F_{hor})_k (F\Delta x_{hor})_k + (Fw_{hor})_k$ where $w_{hor} = w_{hor,r} - w_{hor,s}$ is a white noise with zero mean and covariance $Q_{hor} \cong Q_{hor,r} + Q_{hor,s}$.

The error $\Delta x'_k \cong x' - \hat{x}'_k$ in estimating the new state vector x' and the corresponding error covariance matrix are initialised in the following manner: $\Delta x' = D\Delta x_k$ and $P'_k = DP_k D^T$ where D is the matrix that transforms $\Delta x_k$ to $\Delta x'_k = [\Delta r_r^T, \Delta \dot{r}_r^T, \Delta\Delta x_{hor1}^T, \ldots, \Delta\Delta x_{horN}^T]^T$ The new error state vector is denoted $\hat{X}'_k = [\hat{r}_r^T, \hat{\dot{r}}_r^T, \Delta\hat{x}_{Hor1}^T, \ldots, \Delta\hat{x}_{HorN}^T]^T$ so that $\hat{X}'_k = D\hat{X}_k$. If the vector $\hat{X}_k$ is of dimension U*1 and the vector $\hat{X}'_k$ is of dimension V*1 then the D matrix is of dimension V*U. D is calculated at each change of mode according to the number of 5G base stations available.

Between two correction instants, the estimator uses the dynamic-range models described previously for propagating the estimates of the states $\hat{X}_k$ or $\hat{X}'_k$, supplying the prediction of the corresponding error covariance matrix, and uses the observation model.

In mapping mode, the state prediction is made:

$$\hat{X}_k^- = F_k \hat{X}_{k-1} \text{ with}$$

$$\hat{X}_k^- = F_k \hat{X}_{k-1} \text{ with } \hat{X}_k^- = \left[\hat{r}_r^{-T}, \hat{\dot{r}}_r^{-T}, \hat{x}_{hor,r}^{-T}, \hat{r}_{s1}^{-T}, \hat{x}_{hor,s1}^{-T}, \ldots, \hat{r}_{sN}^{-T}, \hat{x}_{hor,sN}^{-T}\right]^T$$

$$F_k = \begin{bmatrix} I_{3\times3} & T\cdot I_{3\times3} & 0_{3\times2} & 0_{3\times3} & 0_{3\times2} & \cdots & 0_{3\times3} & 0_{3\times2} \\ 0_{3\times3} & I_{3\times3} & 0_{3\times2} & 0_{3\times3} & 0_{3\times2} & \cdots & 0_{3\times3} & 0_{3\times2} \\ 0_{2\times3} & 0_{2\times3} & \begin{bmatrix}1 & T\\0 & 1\end{bmatrix} & 0_{2\times3} & 0_{2\times2} & \cdots & 0_{2\times3} & 0_{2\times2} \\ 0_{3\times3} & 0_{3\times3} & 0_{3\times2} & I_{3\times3} & 0_{3\times2} & \cdots & 0_{3\times3} & 0_{3\times2} \\ 0_{2\times3} & 0_{2\times3} & 0_{2\times2} & 0_{2\times3} & \begin{bmatrix}1 & T\\0 & 1\end{bmatrix} & \cdots & 0_{2\times3} & 0_{2\times2} \\ \vdots & \vdots & \vdots & \vdots & \vdots & \ddots & \vdots & \vdots \\ 0_{3\times3} & 0_{3\times3} & 0_{3\times2} & 0_{3\times3} & 0_{3\times2} & \cdots & I_{3\times3} & 0_{3\times2} \\ 0_{2\times3} & 0_{2\times3} & 0_{2\times2} & 0_{2\times3} & 0_{2\times2} & \cdots & 0_{2\times3} & \begin{bmatrix}1 & T\\0 & 1\end{bmatrix} \end{bmatrix}$$

Note that $$F_k \cong \text{diag}[F_r, F_s, \ldots, F_s], \text{ where } F_s = \text{diag}[I_{3\times3}, F_{hor}],$$

$$F_{hor} = \begin{bmatrix}1 & T\\0 & 1\end{bmatrix}, F_r = \begin{bmatrix} I_{3\times3} & T\cdot I_{3\times3} & 0_{3\times2} \\ 0_{3\times3} & I_{3\times3} & 0_{3\times2} \\ 0_{2\times3} & 0_{2\times3} & \begin{bmatrix}1 & T\\0 & 1\end{bmatrix} \end{bmatrix}.$$

Likewise, the error covariance prediction matrix is thus given by:

$$P_k^- = F_k P_{k-1} F_k^T + Q_k$$

$$F_k \cong \text{diag}[F_r, F_s, \ldots, F_s]$$

$$Q_k \cong \text{diag}[Q_r, Q_s, \ldots, Q_s]$$

In 5G mode, the following state prediction is made:

$$\hat{X}_k^{\prime -} = F_k' \hat{X}_{k-1}'$$

With $\hat{X}_k^{\prime -} = \left[\hat{r}_r^{\prime T}, \hat{\dot{r}}_r^{\prime T}, \Delta\hat{x}_{hor_1}^{\prime T}, \ldots, \Delta\hat{x}_{hor_N}^{\prime T}\right]^T$ $$F_k' \cong \begin{bmatrix} I_{3\times3} & T\cdot I_{3\times3} & 0_{3\times2} & \cdots & 0_{3\times2} \\ 0_{3\times3} & I_{3\times3} & 0_{3\times2} & \cdots & 0_{3\times2} \\ 0_{2\times3} & 0_{2\times3} & \begin{bmatrix}1 & T\\0 & 1\end{bmatrix} & \cdots & 0_{2\times3} \\ \vdots & \vdots & \vdots & \ddots & \vdots \\ 0_{2\times3} & 0_{2\times3} & 0_{2\times2} & \cdots & \begin{bmatrix}1 & T\\0 & 1\end{bmatrix} \end{bmatrix}$$

Likewise, the error covariance prediction matrix $P_k'^-$ has the same form as in the equation except that $F_k$ is replaced by $F_k'$ and $Q_k$ by $$Q_k' \cong DQ_k D^T = \text{diag}[Q_{pv}, Q_{hor}], \text{ where:}$$

$$Q_{pv} = \begin{bmatrix} S_p\frac{T^3}{3} & 0 & 0 & S_p\frac{T^2}{2} & 0 & 0 \\ 0 & S_p T & 0 & 0 & S_p\frac{T^2}{2} & 0 \\ S_p\frac{T^2}{2} & 0 & S_p T & 0 & 0 & 0 \\ 0 & 0 & 0 & S_p\frac{T^3}{3} & 0 & S_p\frac{T^2}{2} \\ 0 & S_p\frac{T^2}{2} & 0 & 0 & S_p\frac{T^3}{3} & 0 \\ 0 & 0 & 0 & S_p\frac{T^2}{2} & 0 & S_p T \end{bmatrix},$$

$S_p$ is the speed noise power spectrum, $$Q_{hor} = \begin{bmatrix} Q_{hor,r} + Q_{hor,s1} & Q_{hor,r} & \cdots & Q_{hor,r} \\ Q_{hor,r} & Q_{hor,r} + Q_{hor,s2} & \cdots & Q_{hor,r} \\ \vdots & \vdots & \ddots & \vdots \\ Q_{hor,r} & Q_{hor,r} & & Q_{hor,r} + Q_{hor,sN} \end{bmatrix}.$$

The EK-SLAM estimator corrects the state errors by using the following EKF correction equations:

$$K_k = P_k^- H_k^T (H_k P_k^- H_k^T + R_k)^{-1}$$

$$\hat{X}_k = \hat{X}_k^- + K_k(Z_k - Z_k^-)$$

$$P_k = (I - K_k H_k) P_k^-$$

Where $Z_k^-$ is the measurement estimated from the observation model. $Z_k^-$ can also be estimated using the Jacobian $H_k$ and the a priori state prediction $\hat{X}_k^-$: $Z_k^- = H_k \hat{X}_k^-$. The dimension of the covariance matrix of the measurement noise $R_k$ depends on the number M of GNSS satellites processed and/or the number of 5G base stations the signals of which are received. L=N+M is the total number of transmitters available. $R_k$ is a matrix of dimension 2L×2L defined by:

$$R_k = \text{diag}\left[R_A^{GNSS}, R_B^{GNSS}, R_A^{5G}, R_B^{5G}\right]$$

Where:

$$R_A^{GNSS} = \begin{bmatrix} \sigma_{1DLL}^2 & 0 & \cdots & 0 \\ 0 & \sigma_{2DLL}^2 & \cdots & 0 \\ \vdots & \vdots & \ddots & \vdots \\ 0 & 0 & \cdots & \sigma_{MDLL}^2 \end{bmatrix},$$

$$R_B^{GNSS} = \begin{bmatrix} \sigma_{1FLL}^2 & 0 & \cdots & 0 \\ 0 & \sigma_{2FLL}^2 & \cdots & 0 \\ \vdots & \vdots & \ddots & \vdots \\ 0 & 0 & \cdots & \sigma_{MFLL}^2 \end{bmatrix},$$

$$R_A^{5G} = \begin{bmatrix} \sigma_{1DLL}^2 & 0 & \cdots & 0 \\ 0 & \sigma_{2DLL}^2 & \cdots & 0 \\ \vdots & \vdots & \ddots & \vdots \\ 0 & 0 & \cdots & \sigma_{NDLL}^2 \end{bmatrix},$$

$$R_B^{5G} = \begin{bmatrix} \sigma_{1FLL}^2 & 0 & \cdots & 0 \\ 0 & \sigma_{2FLL}^2 & \cdots & 0 \\ \vdots & \vdots & \ddots & \vdots \\ 0 & 0 & \cdots & \sigma_{NFLL}^2 \end{bmatrix},$$

$$\sigma_{DLL}^2 = \frac{B_n^{DLL} d}{2 C/N_0}, \sigma_{FLL}^2 = \frac{B_n^{FLL} d}{\pi^2 T_n^2 C/N_0}, B_n^{DLL}:$$

DLL loop band of the GNSS or 5G signal followed, $B_n^{FLL}$:
FLL loop band of the GNSS or 5G signal followed, $T_n$:
coherent integration time of the GNSS or 5G DLL loop of interest, $C/N_0$: estimate of the carrier-to-noise ratio of the GNSS or 5G channel of interest, and d: chip spacing between the Early and Late correlators of the GNSS or 5G DLL of interest.

In mapping mode, with $Z_k \cong [z_{sv}^T, z_s^T]^T$, the corresponding Jacobian matrix is obtained by:

$$H_k = [H_{sv}^T, H_s^T]^T$$

$$H_{sv} = \begin{bmatrix} \hat{a}_{sv_1}^T & 0_{1\times 3} & h_{hor}^T & 0_{1\times 5N} \\ \vdots & \vdots & \vdots & \vdots \\ \hat{a}_{sv_M}^T & 0_{1\times 3} & h_{hor}^T & 0_{1\times 5N} \\ 0_{1\times 3} & \hat{a}_{sv_1}^T & h_{hor}^{\prime T} & 0_{1\times 5N} \\ \vdots & \vdots & \vdots & \vdots \\ 0_{1\times 3} & \hat{a}_{sv_M}^T & h_{hor}^{\prime T} & 0_{1\times 5N} \end{bmatrix},$$

$$Z_k = \begin{bmatrix} z_{s_1} \\ \vdots \\ z_{s_N} \\ \dot{z}_{s_1} \\ \vdots \\ \dot{z}_{s_N} \end{bmatrix}$$

$$(z_{s_n})_k = (\|r_r - r_{s_n}\|^2 + c \cdot [\delta t_r - \delta t_{s_n}])_k + (v_{s_n})_k$$

$$(\dot{z}_{s_n})_k = \left(\frac{1 - \frac{1}{c}[V_{s_n} - \dot{r}_r \cdot \hat{a}_{s_n}^T]}{1 + (\delta t_r - \delta t_{s_n})}\lambda\right)_k + (w_{s_n})_k$$

$$\hat{X}_k^{\prime -} = F_k^\prime \hat{X}_{k-1}^\prime$$

With $\hat{X}_k^{\prime -} = \left[\hat{r}_r^{\prime T}, \hat{\dot{r}}_r^{\prime T}, \Delta\hat{x}_{hor1}^{\prime T}, \ldots, \Delta\hat{x}_{horN}^{\prime T}\right]^T$ $$H_s = \begin{bmatrix} \hat{a}_{s_1}^T & 0_{1\times 3} & h_{hor}^T & H_{s_1} & \cdots & 0 \\ \vdots & \vdots & \vdots & \vdots & \ddots & \vdots \\ \hat{a}_{s_N}^T & 0_{1\times 3} & h_{hor}^T & 0 & \cdots & H_{s_N} \\ 0_{1\times 3} & \hat{a}_{s_1}^T & h_{hor}^{\alpha T} & H_{s_1}^\alpha & \cdots & 0 \\ \vdots & \vdots & \vdots & \vdots & \ddots & \vdots \\ 0_{1\times 3} & \hat{a}_{s_N}^T & h_{hor}^{\alpha T} & 0 & \cdots & H_{s_N}^\alpha \end{bmatrix}$$

where $\hat{a}_{sv_m}^T \cong \frac{\hat{r}_r - r_{sv_m}}{\|\hat{r}_r - r_{sv_m}\|}$, $h_{hor} \cong [-1, 0]^T, h_{hor}^\alpha \cong [0, -1]^T, \hat{a}_{s_n}^T \cong \frac{\hat{r}_r - r_{s_n}}{\|\hat{r}_r - r_{s_n}\|}$, $H_{s_n} \cong \left[-\hat{a}_{s_n}^T, -h_{hor}^T\right]$, and $H_{s_n}^\alpha \cong \left[-\hat{a}_{s_n}^T, -h_{hor}^{\alpha T}\right]$.

The correction produces the a posteriori estimate $\hat{X}_k$ and the a posteriori estimate of the corresponding error covariance matrix $P_k$. The true states (positions, speeds, clocks) are updated at the instant k by adding the a posteriori error estimate $\hat{X}_k$ to the estimates of true states at the instant k−1 (i.e. $\hat{x}_k = \hat{x}_{k-1} + \hat{X}_k$). In 5G mode, only the 5G pseudo-distances are available with $z = z_s$, and the Jacobian is given by:

$$H_k^\prime = \begin{bmatrix} \hat{a}_{s_1}^T & 0_{1\times 3} & H_{s_1}^\prime & \cdots & 0 \\ \vdots & \vdots & \vdots & \ddots & \vdots \\ \hat{a}_{s_N}^T & 0_{1\times 3} & 0 & \cdots & H_{s_N}^\prime \\ 0_{1\times 3} & \hat{a}_{s_1}^T & H_{s_1}^{\alpha\prime} & \cdots & 0 \\ \vdots & \vdots & \vdots & \ddots & \vdots \\ 0_{1\times 3} & \hat{a}_{s_N}^T & 0 & \cdots & H_{s_N}^{\alpha\prime} \end{bmatrix}$$

where $H_{s_n}^\prime \cong \left[\hat{a}_{s_n}^T, h_{hor}^T\right]$ and $H_{s_n}^{\alpha\prime} \cong \left[-\hat{a}_{s_n}^T, h_{hor}^{\alpha T}\right]$.

The correction produces the a posteriori estimate $\hat{X}_k^\prime$ and the a posteriori estimate of the corresponding error covariance matrix $P_k^\prime$. The true states (positions, speeds, clocks) are updated at the instant k by adding the a posteriori error estimate $\hat{X}_k^\prime$ to the estimates of true states at the instant k−1 (i.e. $\hat{x}_k = \hat{x}_{k-1} + \hat{X}_k^\prime$).

In 5G mode, let N be the number of 5G base stations received:

X represents 3+3+2*N states and Z represents N position difference observations and N speed difference observations.

-continued $$F'_k \cong \begin{bmatrix} I_{3\times3} & T \cdot I_{3\times3} & O_{3\times2} & \cdots & O_{3\times2} \\ O_{3\times3} & I_{3\times3} & O_{3\times2} & \cdots & O_{3\times2} \\ O_{2\times3} & O_{2\times3} & \begin{bmatrix} 1 & T \\ 0 & 1 \end{bmatrix} & \cdots & O_{2\times3} \\ \vdots & \vdots & \vdots & \ddots & \vdots \\ O_{2\times3} & O_{2\times3} & O_{2\times2} & \cdots & \begin{bmatrix} 1 & T \\ 0 & 1 \end{bmatrix} \end{bmatrix}$$

$$Q = \begin{bmatrix} \begin{bmatrix} S_p \frac{T^3}{3} & 0 & 0 & S_p \frac{T^2}{2} & 0 & 0 \\ 0 & S_p T & 0 & 0 & S_p \frac{T^2}{2} & 0 \\ S_p \frac{T^2}{2} & 0 & S_p T & 0 & 0 & 0 \\ 0 & 0 & 0 & S_p \frac{T^3}{3} & 0 & S_p \frac{T^2}{2} \\ 0 & S_p \frac{T^2}{2} & 0 & 0 & S_p \frac{T^3}{3} & 0 \\ 0 & 0 & 0 & S_p \frac{T^2}{2} & 0 & S_p T \end{bmatrix} & [0] \\ [0] & \begin{bmatrix} Q_{hor,r} + Q_{hor,s1} & Q_{hor,r} & \cdots & Q_{hor,r} \\ Q_{hor,r} & Q_{hor,r} + Q_{hor,s2} & \cdots & Q_{hor,r} \\ \vdots & \vdots & \ddots & \vdots \\ Q_{hor,r} & Q_{hor,r} & Q_{hor,r} & Q_{hor,r} + Q_{hor,sN} \end{bmatrix} \end{bmatrix}$$

$$Q_{hor,s} = \begin{bmatrix} S_{w\dot{\delta}t_s} T + S_{w\dot{\delta}t_s} \frac{T^3}{3} & S_{w\dot{\delta}t_s} \frac{T^2}{2} \\ S_{w\dot{\delta}t_s} \frac{T^2}{2} & S_{w\dot{\delta}t_s} T \end{bmatrix}$$

$$Q_{hor,r} = \begin{bmatrix} S_{w\dot{\delta}t_r} T + S_{w\dot{\delta}t_s} \frac{T^3}{3} & S_{w\dot{\delta}t_r} \frac{T^2}{2} \\ S_{w\dot{\delta}t_r} \frac{T^2}{2} & S_{w\dot{\delta}t_r} T \end{bmatrix}$$

The matrix $H_k$ is of the form:

$$\begin{bmatrix} \hat{a}_{s_1}^T & 0_{1\times3} & h_{hor}^T & H_{s_1} & \cdots & 0 \\ \vdots & \vdots & \vdots & \vdots & \ddots & \vdots \\ \hat{a}_{s_N}^T & 0_{1\times3} & h_{hor}^T & 0 & \cdots & H_{s_N} \\ 0_{1\times3} & \hat{a}_{s_1}^T & h_{hor}^{\alpha T} & h_{s_1}^\alpha & \cdots & 0 \\ \vdots & \vdots & \vdots & \vdots & \ddots & \vdots \\ 0_{1\times3} & \hat{a}_{s_N}^T & h_{hor}^{\alpha T} & 0 & \cdots & h_{s_N}^\alpha \end{bmatrix}$$

$$R = \begin{bmatrix} R_A^{5G} & [0] \\ [0] & R_A^{5G} \end{bmatrix}$$

$$R_A^{5G} = \begin{bmatrix} \sigma_{1DLL}^2 & 0 & \cdots & 0 \\ 0 & \sigma_{2DLL}^2 & \cdots & 0 \\ \vdots & \vdots & \ddots & \vdots \\ 0 & 0 & \cdots & \sigma_{NDLL}^2 \end{bmatrix}$$

$$R_B^{5G} = \begin{bmatrix} \sigma_{1FLL}^2 & 0 & \cdots & 0 \\ 0 & \sigma_{2FLL}^2 & \cdots & 0 \\ \vdots & \vdots & \ddots & \vdots \\ 0 & 0 & \cdots & \sigma_{NFLL}^2 \end{bmatrix}$$

In GNSS mode, standard mode, if M is the number of satellites the signals of which are received, X represents 3+3+2 states that are independent of the number of states and Z represents M position difference observations and M speed difference observations.

$$Z_k = \begin{bmatrix} Z_{sv1} \\ \vdots \\ Z_{svM} \\ \dot{Z}_{sv1} \\ \vdots \\ \dot{Z}_{svM} \end{bmatrix}$$

$$x_r = \begin{bmatrix} r_r^T, & \dot{r}_r^T, & x_{hor,r}^T \end{bmatrix}^T$$

$$(x_r)_{k+1} = F_r(x_r)_k + (w_r)_k$$

$$(z_{sv_m})_k = \left( \|r_r - r_{sv_m}\|^2 + c \cdot [\delta t_r - \delta t_{sv_m}] \right)_k + (v_{sv_m})_k$$

$$(\dot{z}_{sv_m})_k = \left( \frac{1 - \frac{1}{c}[V_{sv_m} - \dot{r}_r \cdot \hat{a}_{sv_m}^T]}{1 + (\delta \dot{t}_r - \delta \dot{t}_{sv_m})} \lambda \right)_k + (w_{sv_m})_k$$

$$F_r = \begin{bmatrix} I_{3\times 3} & T \cdot I_{3\times 3} & 0_{3\times 2} \\ 0_{3\times 3} & I_{3\times 3} & 0_{3\times 2} \\ 0_{2\times 3} & 0_{2\times 3} & \begin{bmatrix} 1 & T \\ 0 & 1 \end{bmatrix} \end{bmatrix}$$

$Q_r =$ $$\begin{bmatrix} S_p T^3/3 & 0 & 0 & S_p T^2/2 & 0 & 0 & 0 & 0 \\ 0 & S_p T & 0 & 0 & S_p T^2/2 & 0 & 0 & 0 \\ S_p T^2/2 & 0 & S_p T & 0 & 0 & 0 & 0 & 0 \\ 0 & 0 & 0 & S_p T^3/3 & 0 & S_p T^2/2 & 0 & 0 \\ 0 & S_p T^2/2 & 0 & 0 & S_p T^3/3 & 0 & 0 & 0 \\ 0 & 0 & 0 & S_p T^2/2 & 0 & S_p T & 0 & 0 \\ 0 & 0 & 0 & 0 & 0 & 0 & c^2 S_{w\delta t_r} T + c^2 S_{w\dot{\delta} t_r} T^3/3 & c^2 S_{w\dot{\delta} t_r} T^2/2 \\ 0 & 0 & 0 & 0 & 0 & 0 & c^2 S_{w\dot{\delta} t_r} T^2/2 & c^2 S_{w\dot{\delta} t_r} T \end{bmatrix}$$

The matrix $H_k$ is of the form:

$$\begin{bmatrix} \hat{a}_{s_1}^T & 0_{1\times 3} & h_{hor}^T \\ \vdots & \vdots & \vdots \\ \hat{a}_{s_M}^T & 0_{1\times 3} & h_{hor}^T \\ 0_{1\times 3} & \hat{a}_{s_1}^T & h_{hor}^{\alpha T} \\ \vdots & \vdots & \vdots \\ 0_{1\times 3} & \hat{a}_{s_M}^T & h_{hor}^{\alpha T} \end{bmatrix}$$

$$\begin{bmatrix} R_A^{GNSS} & [0] \\ [0] & R_A^{GNSS} \end{bmatrix}$$

$$R_A^{GNSS} = \begin{bmatrix} \sigma_{1DLL}^2 & 0 & \cdots & 0 \\ 0 & \sigma_{2DLL}^2 & \cdots & 0 \\ \vdots & \vdots & \ddots & \vdots \\ 0 & 0 & \cdots & \sigma_{MDLL}^2 \end{bmatrix}$$

$$R_B^{GNSS} = \begin{bmatrix} \sigma_{1FLL}^2 & 0 & \cdots & 0 \\ 0 & \sigma_{2FLL}^2 & \cdots & 0 \\ \vdots & \vdots & \ddots & \vdots \\ 0 & 0 & \cdots & \sigma_{MFLL}^2 \end{bmatrix}$$

In mapping mode, X represents 3+3+2+(3+2)*N states and X is not the concatenation of the separate 5G and GNSS states. Z represents M observations of position difference and then M observations of speed difference+N observations of position difference and N of speed differences.

$$Z_k = \begin{bmatrix} Z_{sv1} \\ \vdots \\ Z_{svM} \\ \dot{Z}_{sv1} \\ \vdots \\ \dot{Z}_{svM} \\ Z_{s1} \\ \vdots \\ Z_{sN} \\ \dot{Z}_{s1} \\ \vdots \\ \dot{Z}_{sN} \end{bmatrix}$$

$$\hat{X}_k = \begin{bmatrix} \hat{r}_r^T, & \hat{\dot{r}}_r^T, & \hat{x}_{hor,r}^T, & \hat{r}_{s1}^T, \hat{x}_{hor,s1}^T, & \ldots, & \hat{r}_{sN}^T, \hat{x}_{hor,sN}^T \end{bmatrix}^T$$

$$F_k = \begin{bmatrix} I_{3\times3} & T\cdot I_{3\times3} & 0_{3\times2} & 0_{3\times3} & 0_{3\times2} & \ldots & 0_{3\times3} & 0_{3\times2} \\ 0_{3\times3} & I_{3\times3} & 0_{3\times2} & 0_{3\times3} & 0_{3\times2} & \ldots & 0_{3\times3} & 0_{3\times2} \\ 0_{2\times3} & 0_{2\times3} & \begin{bmatrix} 1 & T \\ 0 & 1 \end{bmatrix} & 0_{2\times3} & 0_{2\times2} & \ldots & 0_{2\times3} & 0_{2\times2} \\ 0_{3\times3} & 0_{3\times3} & 0_{3\times2} & I_{3\times3} & 0_{3\times2} & \ldots & 0_{3\times3} & 0_{3\times2} \\ 0_{2\times3} & 0_{3\times3} & 0_{3\times2} & 0_{2\times3} & \begin{bmatrix} 1 & T \\ 0 & 1 \end{bmatrix} & \ldots & 0_{2\times3} & 0_{2\times2} \\ \vdots & \vdots & \vdots & \vdots & \vdots & \ddots & \vdots & \vdots \\ 0_{3\times3} & 0_{3\times3} & 0_{3\times2} & 0_{3\times3} & 0_{3\times2} & \ldots & I_{3\times3} & 0_{3\times2} \\ 0_{2\times3} & 0_{2\times3} & 0_{2\times2} & 0_{2\times3} & 0_{2\times2} & \ldots & 0_{2\times3} & \begin{bmatrix} 1 & T \\ 0 & 1 \end{bmatrix} \end{bmatrix}$$

$$Q = \begin{bmatrix} [Q_r] & [0] & [0] & [0] & [0] \\ [0] & [Q_{s1}] & [0] & [0] & [0] \\ [0] & [0] & \ddots & [0] & [0] \\ [0] & [0] & [0] & \ddots & [0] \\ [0] & [0] & [0] & [0] & [Q_{sN}] \end{bmatrix}$$

$Q_r =$ $$\begin{bmatrix} S_p T^3/3 & 0 & 0 & S_p T^2/2 & 0 & 0 & 0 & 0 \\ 0 & S_p T & 0 & 0 & S_p T^2/2 & 0 & 0 & 0 \\ S_p T^2/2 & 0 & S_p T & 0 & 0 & 0 & 0 & 0 \\ 0 & 0 & 0 & S_p T^3/3 & 0 & S_p T^2/2 & 0 & 0 \\ 0 & S_p T^2/2 & 0 & 0 & S_p T^3/3 & 0 & 0 & 0 \\ 0 & 0 & 0 & S_p T^2/2 & 0 & S_p T & 0 & 0 \\ 0 & 0 & 0 & 0 & 0 & 0 & c^2 S_{w\delta t_r} T + c^2 S_{w\dot{\delta} t_r} T^3/3 & c^2 S_{w\dot{\delta} t_r} T^2/2 \\ 0 & 0 & 0 & 0 & 0 & 0 & c^2 S_{w\dot{\delta} t_r} T^2/2 & c^2 S_{w\dot{\delta} t_r} T \end{bmatrix}$$

$$Q_{si} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & C^2 & C^2 \cdot T \\ 0 & 0 & 0 & 1 & C^2 \end{bmatrix}$$

$$H_k = \begin{bmatrix} H_{sv} \\ H_s \end{bmatrix}$$

The matrix $H_k$ is of the form:

$$H_{sv} = \begin{bmatrix} \hat{a}_{sv_1}^T & 0_{1\times 3} & h_{hor}^T & 0_{1\times 5N} \\ \vdots & \vdots & \vdots & \vdots \\ \hat{a}_{sv_M}^T & 0_{1\times 3} & h_{hor}^T & 0_{1\times 5N} \\ 0_{1\times 3} & \hat{a}_{sv_1}^T & h_{hor}^T & 0_{1\times 5N} \\ \vdots & \vdots & \vdots & \vdots \\ 0_{1\times 3} & \hat{a}_{sv_M}^T & h_{hor}^T & 0_{1\times 5N} \end{bmatrix}$$

$$H_s = \begin{bmatrix} \hat{a}_{s_1}^T & 0_{1\times 3} & h_{hor}^T & H_{s_1} & \cdots & 0 \\ \vdots & \vdots & \vdots & \vdots & \ddots & \vdots \\ \hat{a}_{s_N}^T & 0_{1\times 3} & h_{hor}^T & 0 & \cdots & H_{s_N} \\ 0_{1\times 3} & \hat{a}_{s_1}^T & h_{hor}^{\alpha T} & h_{s_1}^\alpha & \cdots & 0 \\ \vdots & \vdots & \vdots & \vdots & \ddots & \vdots \\ 0_{1\times 3} & \hat{a}_{s_N}^T & h_{hor}^{\alpha T} & 0 & \cdots & h_{s_N}^\alpha \end{bmatrix}$$

Where $\hat{a}_{sv_m}^T \cong \dfrac{\hat{r}_r - r_{sv_m}}{\|\hat{r}_r - r_{sv_m}\|}$, $h_{hor} \cong [-1,\ 0]^T$, $h_{hor}^\alpha \cong [0,\ -1]^T$ $\hat{a}_{s_n}^T \cong \dfrac{\hat{r}_r - r_{s_n}}{\|\hat{r}_r - r_{s_n}\|}$, $H_{s_n} \cong \left[-\hat{a}_{s_n}^T,\ -h_{hor}^T\right]$, et $H_{s_n}^\alpha \cong \left[-\hat{a}_{s_n}^T,\ -h_{hor}^{\alpha T}\right]$ $$R = \begin{bmatrix} R_A^{GNSS} & [0] & [0] & [0] \\ [0] & R_B^{GNSS} & [0] & [0] \\ [0] & [0] & R_A^{5G} & [0] \\ [0] & [0] & [0] & R_B^{5G} \end{bmatrix}$$

Figure 12:
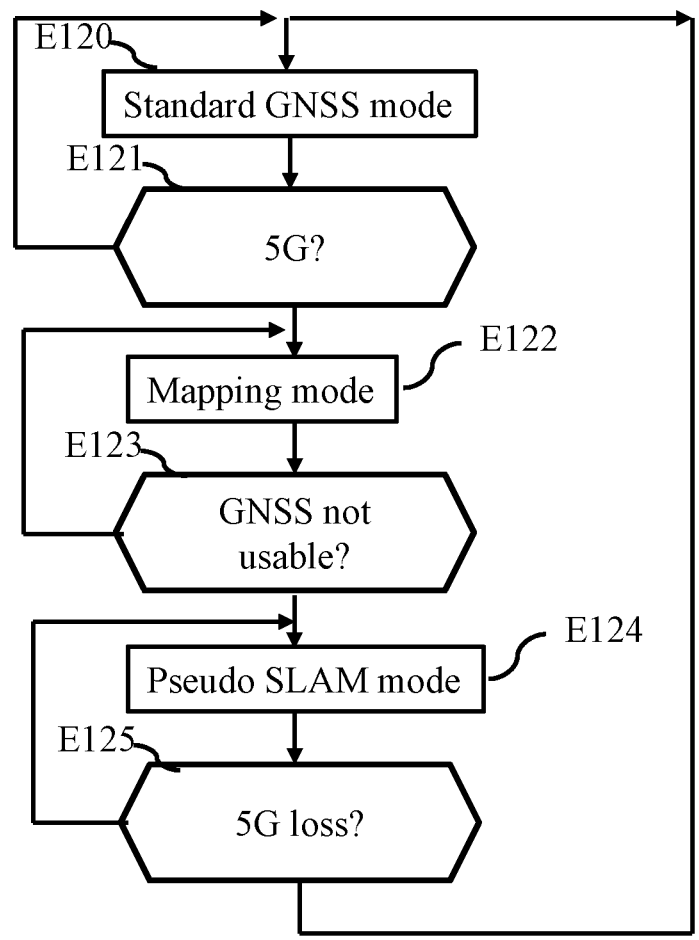
FIG. 12 illustrates schematically a method implemented by the processing module for selecting the operating mode of a navigator.

FIG. 12 illustrates schematically a method implemented by the processing module for selecting the operating mode of a navigator.

The step E120 corresponds to an operating mode wherein only GNSS signals are measured, the operating mode of the navigator is the standard GNSS mode. This mode corresponds for example to the case where the carrier is on the open sea.

At the step E121, the processing module checks whether the signals transmitted by the 5G base stations are being measured.

If so, the processing module passes to the step E122. If not, the processing module returns to the step E120.

The step E122 corresponds to an operating mode wherein GNSS and 5G signals are measured, the operating mode of the navigator is the mapping mode. This mode corresponds for example to the case where the carrier is approaching a port.

At the step E123, the processing module checks whether the GNSS signals cannot be used.

If so, the processing module passes to the step E124, if not, the processing module returns to the step E122.

The step E124 corresponds to a 5G operating mode. This mode corresponds for example to the case where the carrier is docked.

At the step E125, the processing module checks whether the 5G signals cannot be used.

If so, the processing module returns to the step E120. If not, the processing module returns to the step E124.

Figure 13:
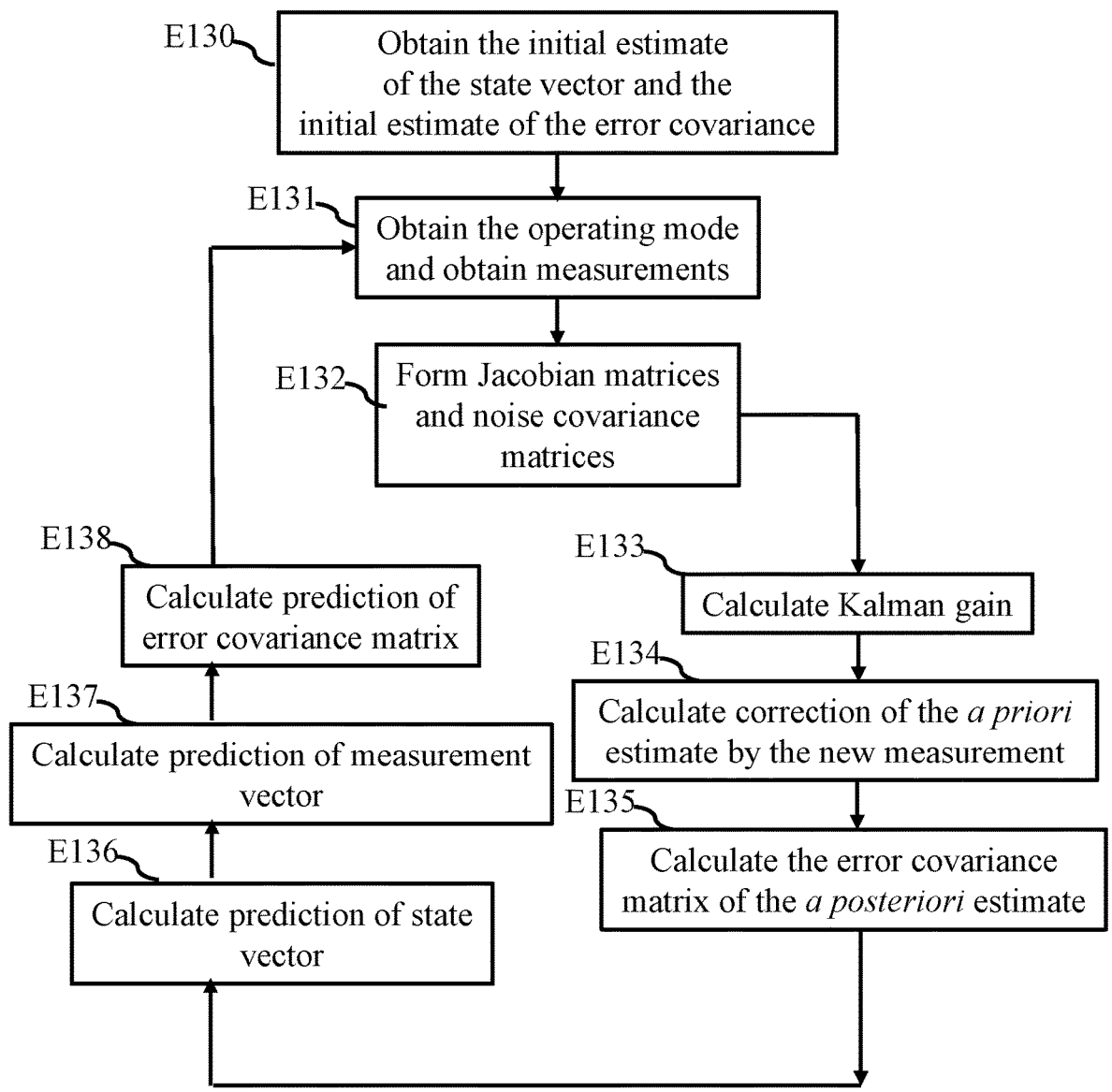
FIG. 13 illustrates schematically a method implemented by a navigator of the loose coupling system between an INS system and a GNSS/5G tight coupling system.

FIG. 13 illustrates schematically a method implemented by a navigator of the loose coupling system between an INS system and a GNSS/5G tight coupling system.

At the step E130, the initial estimate of the state vector $\hat{X}_0^-$ and the initial estimate of the error covariance are obtained.

At the following step E131, the operating mode of the navigator is obtained as well as the measurements $Z_k$, $Z'_k$ or $Z''_k$.

At the step E132, the Jacobian matrices and the process noise covariance matrices are obtained.

If the operating mode is the mapping mode, the matrices $F_k$, $H_k$, $R_k$ and $Q_k$ are obtained.

If the operating mode is the 5G mode, the matrices $F'_k$, $H'_k$, $R'_k$ and $Q'_k$ are obtained.

If the operating mode is the standard GNSS mode, the matrices $F''_k$, $H''_k$, $R''_k$ and $Q''_k$ are obtained.

At the steps E133 to E135, a correction is made using the matrices obtained.

More precisely, a calculation of the Kalman gain is made at the step E133, a calculation of the correction of the a priori estimate of the new measurement is made at the step E134 and a calculation the error covariance matrix of the estimate is calculated.

Thus, when the mode is the mapping mode, the following matrices are calculated:

$K_k = P_k^- H_k^T (H_k P_k^- H_k^T + R_k)^{-1}$ $\hat{X}_k = \hat{X}_k^- + K_k(Z_k - Z_k^{-1})$ $P_k = (I - K_k H_k) P_k^-$ When the mode is the 5G mode, the following matrices are calculated:

$K'_k = P'^-_k H'^T_k (H'_k P'^-_k H'^T_k + R'_k)^{-1}$ $\hat{X}'_k = \hat{X}'^-_k + K'_k(Z'_k - Z'^{-1}_k)$ $P'_k = (I - K'_k H'_k) P'^-_k$ When the mode is the standard GNSS mode, the following matrices are calculated:

$K''_k = P''^-_k H''^T_k (H''_k P''^-_k H''^T_k + R''_k)^{-1}$ $\widehat{X''}_k = \widehat{X''}_k^- + K''_k(Z''_k - Z''^{-1}_k)$ $P''_k = (I - K''_k H''_k) P''^-_k$ At the end of the correction, the prediction is made at the steps E136 to E138. At the step E136, a calculation of the prediction of the state vector is made. At the step E137, the prediction of the measurement vector is made and at the step E138 the prediction of the error covariance matrix is calculated.

Thus, when the mode is the mapping mode, the following predictions are calculated:

$\hat{X}_{k+1}^- = F_k \hat{X}_k$ $Z_{k+1}^- + FH_k \hat{X}_{k+1}^-$ $P_{k+1}^- = F_k P_k F_k^T + Q_k$ When the mode is the 5G mode, the following predictions are calculated:

$\hat{X}'^-_{k+1} = F'_k \hat{X}'_k$ $Z'^-_{k+1} + F'H'_k \hat{X}'^-_{k+1}$ $P'^-_{k+1} = F'_k P'_k F'^T_k + Q'_k$ When the mode is the standard GNSS mode, the following predictions are calculated:

$\widehat{X''}^-_{k+1} = F''_k \widehat{X''}_k$ $Z''^-_{k+1} = F''H''_k \widehat{X''}^-_{k+1}$ $P''^-_{k+1} = F''_k P''_k F''^T_k + Q''_k$

The invention claimed is:

1. A navigation device comprising:
an inertial navigation system coupled with a satellite navigation system wherein information supplied by the satellite navigation system is used for adjusting the inertial navigation system; and
circuitry causing the device to perform measuring signals coming from base stations of a wireless cellular network,
wherein the satellite navigation system and the circuitry are coupled with each other by a tight coupling to form a satellite navigator and/or base-station navigator implementing an estimator with simultaneous localisation and mapping,
wherein the satellite navigation system and the circuitry are coupled to the inertial navigation system by a loose coupling for adjusting the inertial navigation system, and
wherein the satellite and/or base station navigator operates in three operating modes, a first mode being a mode wherein pseudo-distances, pseudo-speeds and carrier-to-noise ratios of the signals coming from base stations of the wireless cellular network and signals from the satellites are available, a second mode being a mode wherein pseudo-distances, pseudo-speeds and carrier-to-noise ratios of the signals coming from base stations of the wireless cellular network are available, and a third mode being a mode wherein pseudo-distances, pseudo-speeds and carrier-to-noise ratios of the signals of the signals of the satellites are available.

2. The device according to claim 1, wherein the device further comprises a matrix-generating module that forms a plurality of matrices comprising a transition matrix, a Jacobian matrix, a measurement-noise covariance matrix and a process-noise covariance matrix.

3. The device according to claim 2, wherein, for each operating mode, the matrix-generating module forms a transition matrix, a Jacobian matrix, a measurement-noise covariance matrix and a process-noise covariance matrix that are different from the matrices formed for the other modes.

4. The device according to claim 1, wherein the navigation device comprises a Kalman filter.

5. A navigation method comprising an inertial navigation system coupled with a satellite navigation system, the information supplied by the satellite navigation system being used for adjusting the inertial navigation system, wherein said method comprises:
measuring signals coming from base stations of a wireless cellular network;
coupling by tight coupling of the satellite navigation system with means for measuring signals coming from base stations of the wireless cellular network to form a satellite navigator and/or base-station navigator implementing an estimator with simultaneous localisation and mapping;
coupling by loose coupling of the satellite navigation system and of the means for measuring signals coming from the base station of the wireless cellular network to the inertial navigation system to adjust the inertial navigation system; and
determining an operating mode of the satellite and/or base-station navigator among three operating modes such that a first mode is a mode wherein pseudo-distances, pseudo-speeds and carrier-to-noise ratios of the signals coming from base stations of the wireless cellular network and signals from the satellites are available, a second mode is a mode wherein pseudo-distances, pseudo-speeds and carrier-to-noise ratios of the signals coming from base stations of the wireless cellular network are available and a third mode is a mode wherein pseudo-distances, pseudo-speeds and carrier-to-noise ratios of the signals of the signals of the satellites are available.

6. The method according to claim 5, wherein said method causes the device to perform generating a matrix that forms a plurality of matrices comprising a transition matrix, a Jacobian matrix, a measurement-noise covariance matrix and a process-noise covariance matrix.

* * * * *